Feb. 21, 1939.   C. E. BUDD   2,148,257
METHOD OF MAKING BRAKE SHOES
Filed Aug. 12, 1936
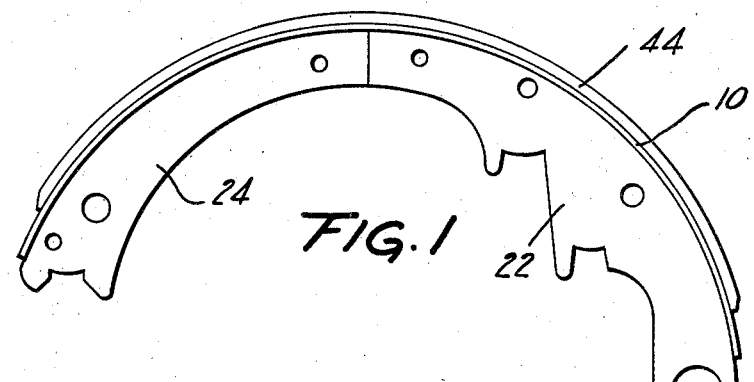
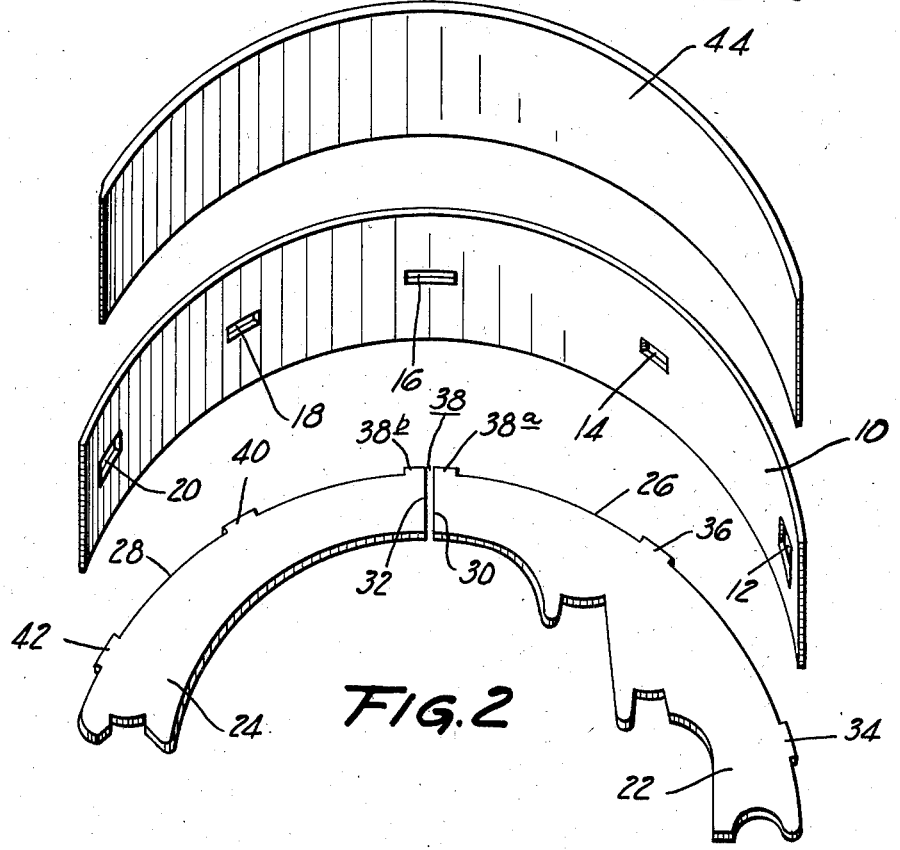
INVENTOR
CLARENCE E. BUDD
BY
ATTORNEY Patented Feb. 21, 1939

2,148,257

UNITED STATES PATENT OFFICE 2,148,257

METHOD OF MAKING BRAKE SHOES

Clarence E. Budd, South Bend, Ind., assignor to Bendix Products Corporation, South Bend, Ind., a corporation of Indiana Application August 12, 1936, Serial No. 95,603

1 Claim. (Cl. 29—152.1)

This invention relates to the manufacture of brake shoes, and more particularly to rigid brake shoes of the type adapted for use in internal expanding brakes.

An object of the invention is to provide economy in the use of material in the manufacture of such a shoe.

Another object is to provide a shoe which may be manufactured from small pieces of scrap stock.

A disadvantage long known in the use of stamped members for the reinforcing webs of brake shoes is the substantial waste of stock occasioned by the arcuate form of such webs and the difference in the inner and outer radii of the edges thereof.

In order to overcome this disadvantage, I prefer to form the web of two pieces which may be joined before or after assembly of the shoe. Material economies approaching one-quarter of the stock ordinarily required for the webs may be obtained in this manner, and in addition a great many pieces ordinarily scrapped may be advantageously utilized.

One important feature of the invention is the means by which rigidity and the proper assembly of the parts is insured. I prefer to accomplish this by forming one-half of a securing lug on each of the abutting ends of the web members and securing these in a rectangular opening pierced in the rim of the shoe.

The above and other objects and one desirable particular construction will more fully appear by reference to the following detailed description of an illustrative embodiment, shown in the accompanying drawing, in which:

Figure 1 is a side elevational view of a brake shoe made in accordance with the invention; and Figure 2 is an exploded perspective view showing in detail the construction and arrangement of the several parts.

Referring to the figures, a rim member 10 is provided, which may be cut from flat strip or sheet stock in generally rectangular form and which is pierced with a plurality of relatively narrow rectangular openings, preferably spaced along the outer line thereof. Five of these openings are shown in the illustrative embodiment and are designated by the numerals 12, 14, 16, 18 and 20. The rim 10 is then formed on any desired radius, as illustrated.

A pair of stampings 22 and 24 constitute the reinforcing web members and are provided with outer arcuate edges 26 and 28 formed on the desired radius of the inner surface of the rim 10, and have preferably straight end edges 30 and 32 respectively which, on assembly, are arranged in abutting relationship and secured together by welding or any other suitable process. The edges 30 and 32 are preferably radial of the finished shoe, as illustrated, but may, if desired, be at any other suitable angle as might be desired for the utilization of various pieces of scrap.

A series of lugs 34, 36, 38a and 38b, 40 and 42, corresponding respectively in size and spacing to the openings 12, 14, 16, 18 and 20, are provided on the web members 22 and 24. An important feature of the invention resides in making the lug 38 in two halves, 38a and 38b, formed respectively at the abutting ends of the two web members 22 and 24. This construction imparts desirable qualities of alinement to the two halves and rigidity to the finished shoe.

The remaining edges of the members 22 and 24 may be formed in any desired shape suitable for engagement with applying devices, anchors and the like, and suitable openings are provided in the web for the attachment of springs and steady rests.

Upon assembly, the two half lugs 38a and 38b go into the opening 16 in the rim 10, and the other corresponding lugs and openings are interengaged, whereupon the lugs are securely welded into the rim 10.

A lining 44 of suitable friction material for frictional engagement with a brake drum is secured to the rim 10 by any desirable means, such as rivets (not shown).

While one desirable embodiment of my invention has been illustrated and described in detail, it is not my intention to be limited by this embodiment, or otherwise than by the terms of the appended claim.

What is claimed is:

That method of making a brake shoe which comprises blanking a rim in generally rectangular form from flat stock, piercing a plurality of rectangular openings along the center line thereof, bending said strip on the arc of a circle, stamping two segmental web members with lugs spaced correspondingly to said openings and with one-half a lug formed at one end of each, placing said ends in abutting relationship, securing the web members to the rim with the two half lugs in one of said openings and the remaining lugs in the corresponding openings, and rigidly securing the abutting ends of the web members together.

CLARENCE E. BUDD.